Patented Aug. 11, 1936

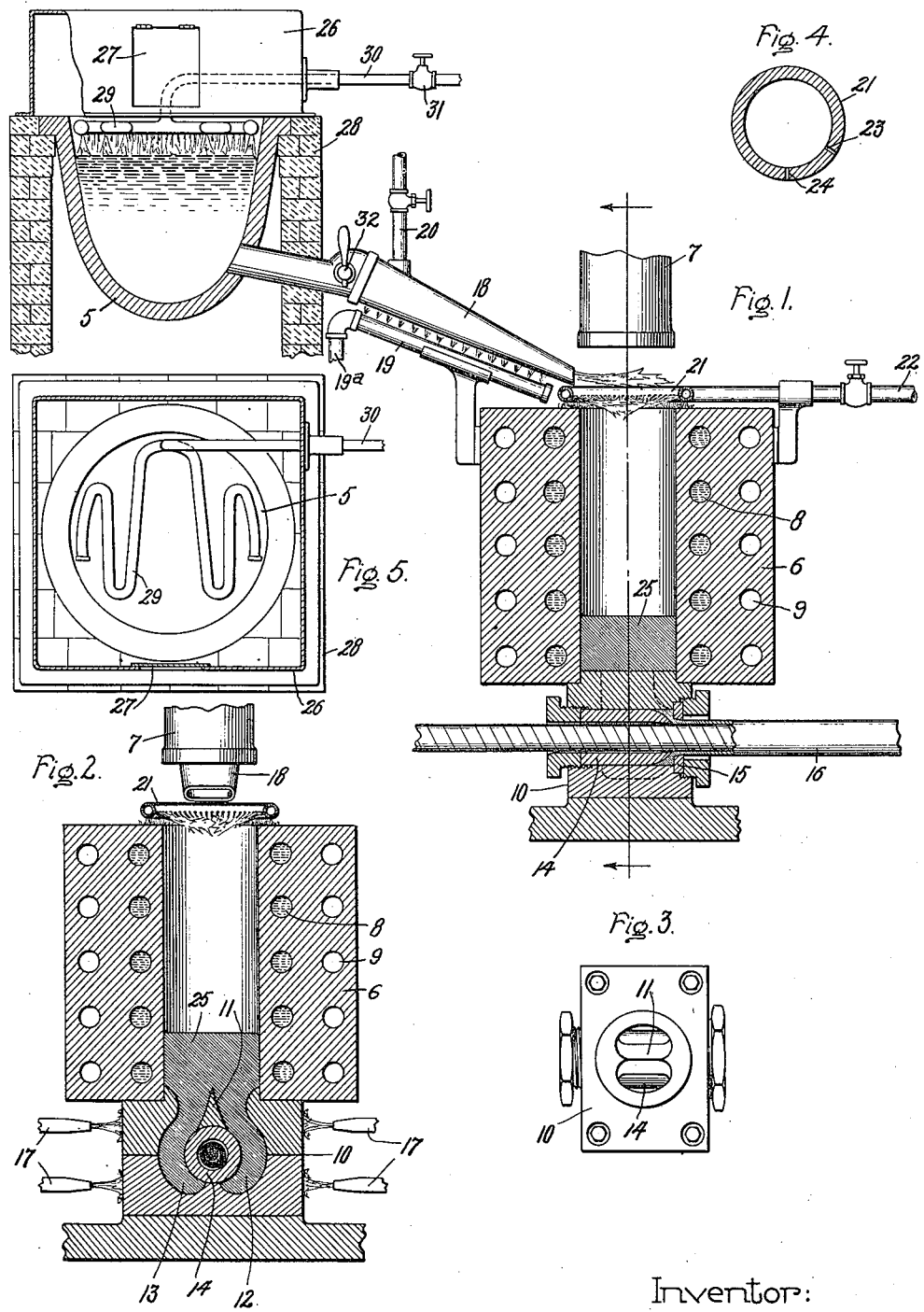

2,050,873

UNITED STATES PATENT OFFICE 2,050,873

METHOD OF AND MEANS FOR MAKING CABLE SHEATHS

Lyall Zickrick, Schenectady, N. Y., assignor to General Electric Company, a corporation of New York Application August 26, 1932, Serial No. 630,514

12 Claims. (Cl. 207—10)

It is customary practice in the manufacture of cables for transmitting electric power to sheath them with lead for the purpose of retaining the insulating fluid used in impregnating the fibrous insulation on the conductor or conductors. It is important that the sheath for all such cables be fluid tight but it is of paramount importance where relatively thin liquid such as oil is used as the impregnating material. When the oil is initially thin and is also heated, a small defect may have very serious consequences. A cable in cooling tends to create a vacuum within the sheath and if it so happens that a pressure lower than atmosphere exists in the region of the defect in the sheath, moisture from the conduit containing the cable or from a manhole will enter the cable and seriously affect the insulating value of the oil. In the Underground Systems Reference Book of the National Electric Light Association for 1931, the statement is made on page 141, and to which I subscribe, that by actual test it has been found that two parts of water in 100,000 parts of oil by volume reduce the dielectric strength of the oil by fifty percent.

In the manufacture of cable sheaths, the lead is commonly heated in an open kettle and then allowed to flow through an open spout into the upper end of the vertical cylinder of a lead press from which it is extruded through a suitable die by a descending piston or ram after having been cooled to a predetermined degree. The die is generally so shaped as to divide the body of hot lead into two streams which are subsequently united to form an annular hollow covering for the cable. The reason for this division is to permit the conductor to be fed through the press and to be maintained central of the finished sheath. As a result of this, the sheath has two longitudinal seams on diametrically opposite sides.

The molten lead in the kettle, that contained in the spout and in the stream issuing therefrom into the press, and also that in the cylinder of the press prior to the inward movement of the piston or ram is exposed to the effect of the atmosphere. Also the molten lead in falling on top of the previous charge, which has been solidified, causes considerable spattering which forms small particles that are at least momentarily largely or completely exposed to the atmosphere. Due to this exposure to atmosphere, a certain amount of lead oxide is formed which tends to collect at the top of the charge in the cylinder and more especially in the center thereof and which ultimately finds its way through the die into the body of the sheath. The oxide is detrimental to the quality of the sheath and if present in any considerable quantity, especially if localized in any one area may result in a defective sheath. The oxide has a tendency to locate more especially in any seam formed by the union of the lead streams. The oxide is not always visible in the finished sheath as it may be covered by a thin coating of lead so that even the most careful inspection fails to disclose the defects and they only manifest themselves after the cable has been installed and put into service. It is the practice to skim off as much of the oxide as possible from the top of the cylinder with scrapers but this, even when well done, cannot remove all of it. In practice, the scraping usually requires the services of two men, upon whose skill and care much depends. As a net result, more or less oxide finds its way into the finished product.

As previously indicated, the sheath must be impervious throughout the length and this introduces a condition which is peculiar to cable manufacture. Owing to the length of the cable, it is impossible to form the sheath with one filling of the lead press. In one instance with which I am familiar, the length of the cable was of the order of 3800 feet having an outside diameter of 2.012 inches, and to provide the necessary material for the sheath, it was necessary to refill the cylinder of the press twenty-five times. The failure of the sheath at any point means that the entire sheath has to be stripped off and the cable releaded. For the stripping process, it is necessary to have special machinery for cutting the lead, all of which greatly increases the expense. If the defect is one that can be detected in the factory, it is serious but not nearly so serious as where the defect is invisible on inspection and only manifests itself after the cable is installed and put into use. Under this latter condition, the cable has to be removed and returned to the factory for remaking and a new length substituted. Removing a cable length and substituting a new one is of itself an expensive thing to do and may for a time result in a shut down of service to the public. To remake the cable also adds greatly to the expense. Many schemes have been tried to repair sheaths and thus avoid releading but without success, and moreover, customers' specifications are such as to prevent such repairs.

I have discovered that by subjecting the lead in a proper manner to an atmosphere of selected gas, such for example, as hydrogen, or to a suitable mixture of carbon monoxide and hydrogen, the formation of oxide is prevented and that any oxide which may have been formed or existing in the melting kettle is reduced and that by so doing the lead forming the sheath is kept clean and bright until solidified. More specifically, I have discovered that burning hydrogen produces entirely satisfactory results and that the area of flame wherein combustion is incomplete is the most effective. By using gas in the manner stated, the skimming operation becomes unnecessary and the human element is no longer a factor.

The difference in results obtained by using burning hydrogen as compared to an inert or non-oxidizing gas is very marked. An inert or non-oxidizing gas mixes freely with air and the presence of such air defeats, at least to a large extent, the object of my invention. Contrary to this, the reducing action of burning hydrogen, particularly of that portion of the flame acting directly on the lead, is great. In the application of the flame, care should be taken to provide an excess of hydrogen and to keep the active reducing portion of the flame in contact with the lead. This portion of the flame, in addition to its reducing properties, has the advantage of consuming the oxygen of the air with which it comes in contact, which an inert or non-oxidizing gas does not do. As soon as the hydrogen is ignited, there is evidence of active reduction and large areas of the oxidized surface become bright and shiny and free from oxide. The flame temperature and the action of the flame itself are very instrumental in bringing about chemical changes.

In operation, pink white flames arise when the burning hydrogen makes contact with the lead and the molten lead loses its dull gray cast and becomes silvery white in color. The more the lead stream or body is oxidized, the more pronounced are the pink white flames indicating that a chemical reaction is taking place. Another advantage flowing from the fact that the hydrogen is burned is that an explosive mixture cannot be formed and hence the fire hazard is eliminated.

For a consideration of what I believe to be novel and my invention, attention is directed to the accompanying description and the claims appended thereto.

In the accompanying drawing, which is somewhat diagrammatic for simplicity of illustration, Fig. 1 is a view partly in section of a melting kettle and a lead press; Fig. 2 is a sectional view of the press at right angles to that shown in Fig. 1; Fig. 3 is a plan view of the die through which lead flows or is extruded to form the sheath; Fig. 4 is a cross-sectional view of the device for supplying hydrogen to the cylinder of the press, and Fig. 5 is a horizontal section of the melting kettle cover.

5 indicates the lead melting kettle which may have an operating temperature of the order of 400° C. 6 indicates the cylinder of the press and 7 the power actuated piston or ram of the press. The pressure exerted by the piston may be of the order of 46,000 pounds per square inch. The cylinder has a cooling coil 8 and a steam coil 9 by which the temperature of the lead can be accurately controlled, it being understood that the lead is solidified in the cylinder prior to being pressed therefrom. At the bottom of the cylinder is a two-part die 10, in which 11 indicates a bridge for dividing the lead into two streams 12 and 13, and 14 is a cylindrical member, commonly referred to as the "point". 15 indicates the matrix, through the opening in which the lead flows to form the sheath 16. As a further means of controlling the temperature of the lead, a series of gas burners 17 are located adjacent the die blocks. Thus far, the construction may be taken as typical of lead presses in common use in the manufacture of lead sheaths for cables.

18 indicates a controllable spout for conveying molten lead from the kettle to the cylinder of the press. Instead of being open on the top side as usual, it is in the form of a closed conduit. Underneath the spout is a gas burner 19 of any suitable construction having numerous gas openings on its upper side so that the spout may be uniformly heated from end to end. Gas is supplied to the burner 19$^a$ subject to the control of a suitable valve means. 20 indicates a valve controlled pipe for supplying hydrogen to the interior of the spout or conduit 18 where it burns, chiefly at the end of the spout, the flame acting on the stream of lead flowing through the spout. It has been found desirable to have this flame project over at least a substantial part of the cylinder space. A short distance above the cylinder is located a ring 21 having an internal diameter slightly greater than that of the descending piston 7. The ring forms a burner to which hydrogen is supplied by the valve controlled pipe 22 from a source of supply under suitable pressure. The ring burner has two sets of openings 23 and 24. The first set direct the burning hydrogen with incomplete combustion toward the center of the cylinder and are inclined slightly downward. In general the flame is perpendicular to the axis of the cylinder. When in use, the flame blankets or covers the cylinder opening and the molten lead flows through the flaming gas into the cylinder which has the effect of reducing, largely by reason of the fact that the combustion is incomplete, any oxide which may not have been reduced in the spout and also prevents the formation of additional oxide as the stream flows from the spout into the cylinder. Hydrogen is or may be kept burning at this point all of the time, but for reasons of economy, the supply should be reduced after the piston descends and closes the cylinder, and the same is true of the hydrogen supply to the spout. With the hydrogen properly burning when the piston moves out of the cylinder, it forms, so to speak, a cover for the cylinder preventing access of air to the cylinder space and therefor to the remainder of the previous charge of lead, as indicated at 25. Because the piston practically fills the cylinder, its upward movement tends to create a vacuum in the cylinder and just as soon as the piston clears the upper end of the cylinder wall, the vacuum even though it may be of a low order causes the hydrogen to be sucked into the cylinder and largely fill the space therein wherein it burns. This action prevents the tendency for oxide to form on the top of the remainder of the charge 25, or should a small amount exist there for any reason, it will be reduced.

In order to prevent any air from flowing into the cylinder under the burner, and particularly when the piston leaves the cylinder, the jets 24 are provided which direct burning gas against the top of the cylinder in a direction parallel thereto and in so doing form, so to speak, a curtain of flame which effectively stops the inward flow of air in this region. It is advantageous to have the flame from the jets 24 spread laterally over a considerable area of the cylinder head because with the burner jets 23 in operation there is a strong tendency for air to flow between the burner and cylinder which should be prevented as fully as possible.

I may with advantage subject the lead in the kettle to a reducing atmosphere of gas so as to protect it during the melting operation. A common form of melting kettle is provided with a hood 26 having a hinged and inwardly swinging door 27, the hood resting on the brick work 28 enclosing the melting pot. Inside of this hood is a pipe 29 so bent as to cover a considerable area of the open mouth of the melting pot 5. The bends should be so arranged as not to interfere with the introduction of the charge of lead pigs when the door 27 is open. The under side of the pipe is provided with numerous openings, similar to openings 24 in Fig. 4, through which burning gas is discharged downwardly toward the contents of the pot. Gas under suitable pressure is delivered to the bent pipe through the conduit 30 subject to the control of a valve 31. The flow of molten lead from the pot is controlled by a valve 32 of any suitable construction.

In the broader aspects my invention contemplates maintaining the molten lead in an atmosphere of oxide reducing gas from the time it enters the kettle until the piston moves into the cylinder when access of air to the metal is shut off, and this whether the gas is burning or not. For example, the perforated pipe 29, conduit 20 and the ring member 21 may be employed to direct streams of oxide reducing gas into the pot, through the spout 18 and over the upper end of the cylinder in such manner as to form an enveloping atmosphere for the molten lead without said gas being ignited. The use of burning gas, however, has the advantage that it assists in maintaining the temperature of the metal at its desired value whereas the same gas when not fired has a tendency to cool the molten metal. From this it follows that whether the gas is fired or not will depend, at least to a degree, upon whether or not the cooling action has a detrimental effect on the molten metal or on the finished product. My experience has demonstrated that when burning gas is used, the reducing action thereof is the most effective when the combustion is incomplete.

In practicing my invention insofar as the press itself is concerned and particularly with respect to the temperatures of the lead within the cylinder and of the parts of the extruding die, I conform to the established technique now in common use. This is advantageous because it avoids the necessity of special training for the operatives.

The sheath illustrated is in the form of a cylindrical tube, the wall of which is of uniform thickness but my invention is not limited thereto since it may be used in connection with the extrusion of other shapes of tubes by making suitable changes in the die or extruding parts.

Another advantage in my improved process resides in the fact that the combustion of hydrogen is clean and leaves no harmful by-products.

What I claim as new and desire to secure by Letters Patent of the United States, is:

1. The method of forming a lead sheath for an insulated conductor which comprises melting the lead, discharging the molten lead into an open end of a cylinder, subjecting the interior of the cylinder and the molten lead to the action of burning hydrogen, the combustion of which is incomplete, and extruding the lead from the cylinder in the form of an enclosure for the insulated conductor.

2. In an apparatus of the character described, the combination of a melting kettle, a press comprising a cylinder arranged to receive molten metal from the kettle, a movable ram and extruding dies, a conduit receiving molten lead from the kettle in a region below the level of the molten lead therein and discharging it into the cylinder after the ram is removed therefrom, a means for supplying hydrogen to the conduit and causing it to burn with incomplete combustion at the discharge end thereof to reduce by chemical action oxide formation and to assist in maintaining the temperature of the lead, and a ring burner located at the open end of the cylinder through which the ram is free to move that directs burning hydrogen against the exterior of the ram and the head of the cylinder when the ram is within the cylinder and which when the ram is removed continuously supplies hydrogen under pressure to the interior of the cylinder in which it burns with incomplete combustion and acts on the surface of the residual charge of lead therein to reduce oxides by chemical action, said burner also continuously maintaining a curtain of flame over the opening into the cylinder which is in contact with the stream of lead from the conduit and acts to reduce oxide formation therein prior to its entrance into the cylinder.

3. The method of extruding tubing of easily oxidizable metal in a press having a cylinder, extrusion dies and a movable ram which comprises continuously discharging hydrogen gas into the cylinder after the ram is removed therefrom and burning it therein under conditions of incomplete combustion to cause it to effect by heat and chemical action a reduction to the original metal of any oxide formed on the exposed surface of the residual charge to the original metal and also to consume any oxygen within the cylinder, maintaining a sufficient flow of the aforesaid gas also under conditions of incomplete combustion to form a curtain of flame across the opening into the cylinder when the ram is withdrawn, pouring molten metal through the curtain of flame to fill the cylinder, and finally causing the ram to enter the cylinder and exert pressure on the metal to force it through the die.

4. The method of forming tubing of easily oxidizable metal in a press having a cylinder, extrusion dies and a ram which comprises completely blanketing the open end of the cylinder with a body of burning hydrogen in which combustion is incomplete as the ram moves out of the cylinder so that the suction created by the movement causes a portion of the gas to be sucked into the cylinder and burned therein to reduce therein by heat and chemical action oxide formation on the residual charge, pouring the molten metal through and in contact with the blanketing body of burning hydrogen into the cylinder, cooling the metal to a plastic condition, and finally causing the ram to force the cooled metal through the dies.

5. The method of forming metal tubing in a press having a cylinder, extrusion means and a ram which comprises causing a burning gas to form a curtain of flame in a plane substantially perpendicular to the axis of the cylinder at the entrance thereof so that upon a decrease of pressure within the cylinder due to the outward movement of the ram, a portion of the burning gas will be sucked into the cylinder and thereby prevent by chemical action oxide formation on the residual charge, pouring the molten charge through the curtain of flame to reduce by chemical action the oxide formation therein, reducing the temperature of the charge to a determined degree, and subsequently forcing the metal from the cylinder by the ram to form a tube.

6. The method of forming lead sheaths for electric cables which comprises melting the lead, delivering the molten lead to the cylinder of a press, causing the molten lead to pass through and in contact with a body of burning hydrogen blanketing the entrance of the cylinder to reduce by chemical action oxides previously formed therein, reducing the temperature of the lead in the cylinder, and extruding the lead from the cylinder around a conductor as a core to form a covering therefor.

7. The method of forming lead sheaths for electric cables which comprises melting the lead, delivering the molten lead into the cylinder of a press, causing the molten lead to pass through and in contact with a body of burning hydrogen blanketing the entrance of the cylinder to reduce by chemical action oxides previously formed therein, regulating the supply of hydrogen so that the area of the flame where combustion takes place is incomplete and the oxygen with which it comes in contact is consumed, reducing the temperature of the lead in the cylinder, and extruding the lead from the cylinder around an insulated conductor as a core to form a covering therefor.

8. The method of extruding lead sheaths for cables in addition to the usual steps which comprises supplying a burning gas having oxide reducing characteristics directly into the cylinder wherein it is burned and any oxygen therein consumed after the ram is moved to a position where it would otherwise expose the interior thereof to atmospheric air, maintaining under pressure a flame of burning gas having oxide reducing characteristics entirely across the opening into the cylinder when the ram is removed to protect the cylinder against the admission of atmospheric air, supplying a charge of molten lead to the cylinder through the gas protected opening, the charge and gas being in contact to reduce oxygen by chemical action and thereafter extruding the lead from the cylinder.

9. In an apparatus of the character described, a cylinder, extrusion dies receiving plastic metal from the cylinder, a ram for forcing the metal from the cylinder through the dies, a means for completely blanketing the open end of the cylinder when the ram is moved outwardly therefrom with a body of burning gas which reduces oxide formation by chemical action and consumes oxygen present in the cylinder, means for pouring a charge of molten metal through the blanketing body of burning gas into the cylinder, and means for actuating the ram.

10. In an apparatus of the character described, an extrusion cylinder, a ram arranged for reciprocatory movements with respect to the cylinder, burner means located adjacent the open end of the cylinder, said means having openings for directing the products of combustion of burning oxide reducing gas against the ram when it is within the cylinder and completely across the open end of the cylinder when the ram is removed therefrom, other burner openings for directing flames of said gas against the top of the cylinder to prevent air from flowing under the burner means, and means for supplying a charge of molten metal to the cylinder in such manner that it flows through the flames of burning gas.

11. In an apparatus of the character described, a melting kettle, a press comprising a cylinder and a ram, a conduit for conveying molten lead from the kettle to the cylinder, a burner means having openings for discharging burning gas across the opening of the cylinder in a direction substantially perpendicular to the axis thereof, the burner means being so positioned that as the ram on its outward movement from the cylinder causes a reduction of pressure therein, the burning gas due to said reduction will enter the cylinder in a direction substantially parallel to the wall thereof, and means receiving lead from the cylinder and extruding it in tubular form.

12. In an apparatus for extruding tubing of easily oxidized metal comprising a cylinder, extrusion dies, a power actuated movable ram, an annular burner of larger diameter than the ram and mounted at the entrance to the cylinder for continuously discharging gas under pressure into the cylinder after the ram is removed therefrom and burning therein under conditions of incomplete combustion to effect by heat and chemical action a reduction of any oxide formed on the exposed surface of the residual charge to the original metal and also to consume any oxygen which may exist in the cylinder, the burning gas acting on the surface of the charge as the level thereof rises, a means for directing a charge of molten metal in a stream into and through the aforesaid flaming gas to reduce by heat and chemical action oxides existing therein, a means for moving the ram through the annular burner and aforesaid flaming gas to close the open end of the cylinder, and means located in the wall of the cylinder to control the temperature of the charge prior to the working stroke of the ram.

LYALL ZICKRICK.